US010225055B2

(12) United States Patent
Vajapeyam et al.

(10) Patent No.: US 10,225,055 B2
(45) Date of Patent: Mar. 5, 2019

(54) NETWORK IDENTIFICATION BASED ON DISCOVERY REFERENCE SIGNALS IN WIRELESS COMMUNICATIONS

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 14/950,727

(22) Filed: Nov. 24, 2015

(65) Prior Publication Data

US 2016/0149681 A1 May 26, 2016

Related U.S. Application Data

(60) Provisional application No. 62/085,188, filed on Nov. 26, 2014.

(51) Int. Cl.
*H04L 5/00* (2006.01)
*H04W 56/00* (2009.01)
*H04W 24/10* (2009.01)
*H04W 84/04* (2009.01)
*H04W 16/14* (2009.01)

(52) U.S. Cl.
CPC .......... *H04L 5/0048* (2013.01); *H04W 24/10* (2013.01); *H04W 56/001* (2013.01); *H04W 16/14* (2013.01); *H04W 84/042* (2013.01)

(58) Field of Classification Search
CPC ..... H04L 47/10; H04L 43/50; H04L 12/2697; H04L 43/0852; H04L 43/00
USPC ........................................................ 370/252
See application file for complete search history.

(56) References Cited

U.S. PATENT DOCUMENTS

| 9,014,043 | B2* | 4/2015 | Kim | ................... | H04B 7/0417 |
|---|---|---|---|---|---|
| | | | | | 370/252 |
| 9,554,283 | B2* | 1/2017 | Tabet | ................... | H04W 16/14 |
| 2004/0240525 | A1* | 12/2004 | Karabinis | ............ | H04B 7/2637 |
| | | | | | 375/132 |

(Continued)

FOREIGN PATENT DOCUMENTS

WO WO-2014/089069 A1 6/2014

OTHER PUBLICATIONS

Title 47 Telecommunications, Code of Federal Regulations, Parts 0 to 19, Revised as of Oct. 1, 2013.*

(Continued)

*Primary Examiner* — Gbemileke J Onamuti
*Assistant Examiner* — Sanjay K Dewan
(74) *Attorney, Agent, or Firm* — Arent Fox, LLP

(57) ABSTRACT

Various aspects described herein relate to measuring cells in a public land mobile network (PLMN). An enhanced discovery reference signal (eDRS) of a cell is received on an unlicensed carrier frequency, wherein the eDRS comprises at least a reference signal transmission or a synchronization signal transmission. Measurements of the eDRS for the cell can be performed based at least in part on a configuration associated with a serving cell. The measurements of the eDRS can be reported to the serving cell.

30 Claims, 9 Drawing Sheets

(56) References Cited

U.S. PATENT DOCUMENTS

| | | | | |
|---|---|---|---|---|
| 2012/0201164 | A1* | 8/2012 | Jongren | H04L 5/0048 370/252 |
| 2012/0250631 | A1* | 10/2012 | Hakola | H04L 5/001 370/329 |
| 2013/0070626 | A1 | 3/2013 | Gaal et al. | |
| 2013/0148600 | A1* | 6/2013 | Moulsley | H04B 7/024 370/329 |
| 2014/0198683 | A1* | 7/2014 | Ihm | H04B 7/0417 370/252 |
| 2014/0241194 | A1* | 8/2014 | Zhou | H04W 24/10 370/252 |
| 2015/0222410 | A1* | 8/2015 | Belghoul | H04W 28/085 370/252 |
| 2016/0037503 | A1* | 2/2016 | Wu | H04W 72/0406 370/329 |
| 2016/0095048 | A1* | 3/2016 | Nory | H04W 24/08 370/252 |

OTHER PUBLICATIONS

Huawei (Rapporteur) : "Summary of Email Discussion [86#32] [LTE/SCE-L1] RRM Framework for DRS Measurements," 3GPP Draft; R2-143255 Summary of Email Discussion [86#32], 3rd Generation Partnership Project (3GPP), Mobile Competence Centre ; 650, Route Des Lucioles ; F-06921 Sophia-Antipolis Cedex; France, vol. RAN WG2, No. Dresden, Germany; Aug. 14, 2014-Aug. 22, 2014 Aug. 17, 2014 (Aug. 17, 2014), XP050794332, Retrieved from the Internet: URL:http://www.3gpp.org/ftp/Meetings_3GPP_SYNC/RAN2/Docs/ - -[retrieved on Aug. 17, 2014], 27 pages.

International Search Report and Written Opinion—PCT/US2015/062651—ISA/EPO—Feb. 12, 2016. 16 Total Pages.

Nokia Networks : "On DRS Design for LTE LAA," 3GPP Draft; R1-151839 on DRS Design for LTE LAA, 3rd Generation Partnership Project {3GPP), Mobile Competence Centre; 650, Route Des Lucioles ; F-06921 Sophia-Antipolis Cedex ; France , vol. RAN WG1, No. Belgrade, Serbia; Apr. 20-2015-Apr. 24, 2015 Apr. 10, 2015 {Apr. 10, 2015), XP050949654, Retrieved from the Internet: URL:http://www.3gpp.org/ftp/tsg_ran/WG1_RL1/TSGR1_80b/Docs/ - -[retrieved on Apr. 10, 2015], 5 pages.

ZTE: "Considerations on Measurements for LAA", 3GPP Draft; R1-144827 Measurements for LAA_Final, 3rd Generation Partnership Project (3GPP), Mobile Competence Centre ; 650, Route Des Lucioles; F-06921 Sophia-Antipolis Cedex ; France vol. RAN WG1, No. San Francisco, USA; Nov. 17, 2014-Nov. 21, 2014, Nov. 17, 2014 (Nov. 17, 2014), XP050875893, pp. 1-4.

* cited by examiner

NETWORK IDENTIFICATION BASED ON DISCOVERY REFERENCE SIGNALS IN WIRELESS COMMUNICATIONS

CLAIM OF PRIORITY UNDER 35 U.S.C. § 119

The present application for patent claims priority to Provisional Application No. 62/085,188 entitled "NETWORK IDENTIFICATION BASED ON DISCOVERY REFERENCE SIGNALS IN WIRELESS COMMUNICATIONS" filed Nov. 26, 2014, which is assigned to the assignee hereof and hereby expressly incorporated by reference herein.

BACKGROUND

Described herein are aspects generally related to communication systems, and more particularly, to processing reference signals transmitted in a wireless communication system.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience. In addition, the macro cells may not be able to sufficiently accommodate radio resources for a high number of users.

To improve indoor or other specific geographic coverage, such as for residential homes and office buildings, and/or to offload network traffic from macro cells, additional "small cell" base stations, typically operating at a lower power than the macro cell base stations, have been and are being deployed to supplement conventional macro networks. Small cell base stations may also provide incremental capacity growth, richer user experience, and so on. Additionally, in LTE, small cells have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. This can also result in multiple small cells relating to multiple public land mobile networks (PLMN) operating on the same frequency.

Presently, devices configured to communicate with such small cells in unlicensed frequencies may not be able to distinguish an underlying PLMN of each the small cells, and thus may attempt to establish communications with one or more small cells outside of a current PLMN associated with the device. This may result in failed attempts by the device to handover to a small cell belonging to a different PLMN, to add secondary cell carriers (e.g., in carrier aggregation) belonging to a different PLMN, etc., as well as measurement of cells to which the device may not be able to handover or add a carrier.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Described herein are various aspects related to methods, apparatus, and computer programs for utilizing enhanced discovery reference signals (eDRS) transmitted by network nodes to identify a network associated with the network nodes. For example, a user equipment (UE) can report certain eDRS signals for one or more network nodes to a serving network node for determination of a network associated with the one or more network nodes. In another example, a network node can transmit an eDRS with certain parameters, and/or can configure UEs to receive eDRSs based on the parameters, where the parameters can be common among network nodes of a given network. For example, the eDRS can be transmitted according to a periodic or quasi-periodic pattern, on certain configured resources, with a certain timing, etc. Thus, the UE may measure signals from one or more cells based on determining the parameters associated with the eDRS and may report measurements to a serving cell for considering the one or more cells for handover, carrier addition in carrier aggregation, etc. As such, in one non-limiting example, the aspects described herein may allow the UE to perform differentiated signal measurement, e.g., to differentiate between measurements performed for neighbor cells of a same public land mobile network (PLMN) versus measurements performed for neighbor cells associated with other PLMNs.

In an aspect, a method for measuring cells in a public land mobile network (PLMN) is provided. The method includes receiving an eDRS of a cell on an unlicensed carrier frequency, wherein the eDRS comprises at least a reference signal transmission or a synchronization signal transmission, performing measurements of the eDRS for the cell based at least in part on a configuration associated with a serving cell, and reporting the measurements of the eDRS to the serving cell.

In another aspect, a user equipment for measuring cells in a PLMN is provided. The user equipment includes a transceiver, at least one processor communicatively coupled with the transceiver via a bus for communicating signals in a wireless network, and a memory communicatively coupled with the at least one processor and/or the transceiver via the bus. The at least one processor and the memory are operable to receive, via the transceiver, an eDRS of a cell on an unlicensed carrier frequency, wherein the eDRS comprises at least a reference signal transmission or a synchronization signal transmission, perform measurements of the eDRS for the cell based at least in part on a configuration associated with a serving cell, and report, via the transceiver, the measurements of the eDRS to the serving cell.

In a further aspect, a user equipment for measuring cells in a PLMN is provided. The user equipment includes means for receiving an eDRS of a cell on an unlicensed carrier frequency, wherein the eDRS comprises at least a reference signal transmission or a synchronization signal transmission, means for performing measurements of the eDRS for the cell based at least in part on a configuration associated with a serving cell, and means for reporting the measurements of the eDRS to the serving cell.

In yet another aspect, a computer-readable storage medium including computer-executable code for measuring cells in a PLMN is provided. The code includes code for receiving an eDRS of a cell on an unlicensed carrier frequency, wherein the eDRS comprises at least a reference signal transmission or a synchronization signal transmission, code for performing measurements of the eDRS for the cell based at least in part on a configuration associated with a serving cell, and code for reporting the measurements of the eDRS to the serving cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
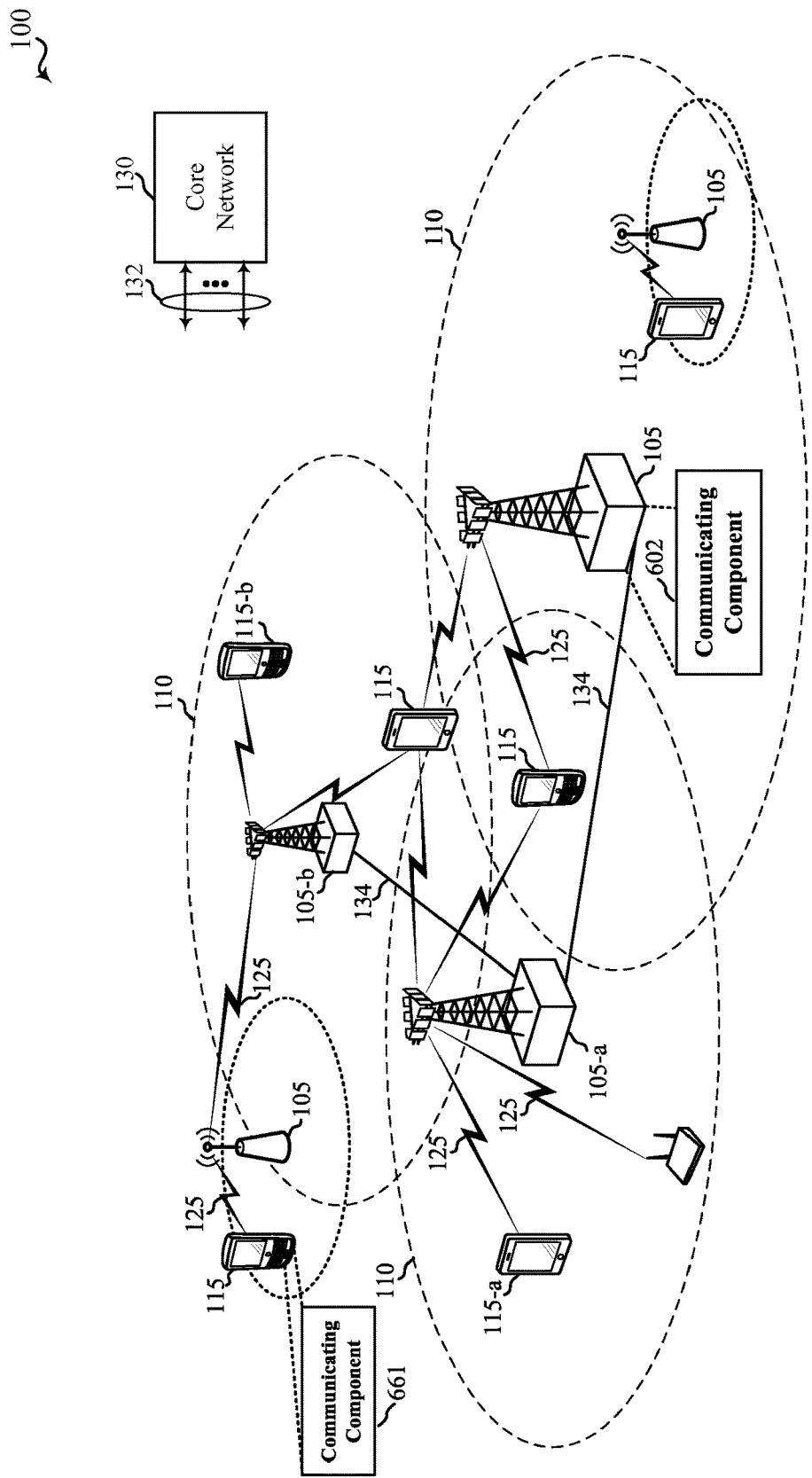
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Described herein are various aspects related to utilizing enhanced discovery reference signals (eDRS) of cells to identify a public land mobile network (PLMN) associated with the cells. As explained in more detail below, an eDRS may be similar to a DRS (e.g., any reference signal such as one or more of a common reference signal (CRS), a primary synchronization signal (PSS), a secondary synchronization signal (SSS), a channel state information reference signal (CSI-RS), and/or the like), but may be different in that a DRS may be periodic and not subject to listen-before-talk or clear channel assessment (CCA) often required of an eDRS in radio access technologies over unlicensed spectrums, and/or in that an eDRS may have a mandatory CSI-RS that may be explicitly or implicitly linked to a PLMN identifier (ID). As such, in one non-limiting example, the aspects described herein may allow the UE to perform differentiated signal measurement, e.g., to differentiate between measurements performed for neighbor cells of a same PLMN versus measurements performed for neighbor cells associated with other PLMNs, based on utilization of eDRSs.

For example, cells within a PLMN can be configured to transmit eDRS according to certain parameters. A user equipment (UE) can be configured by a serving evolved Node B (eNB) (or another type of access point or related cell) to measure and report eDRSs of neighboring cells for determining one or more neighboring cells for handover, carrier addition in carrier aggregation, etc. In one example, the UE can be configured to report measurements of certain multiple eDRSs from neighboring cells, which can be compared to determine which eDRSs belong to a given neighboring cell. In another example, cells can transmit at least some eDRSs using a configuration common to cells in the PLMN. Accordingly, the UE can be configured to measure and report eDRSs corresponding to the configuration, such that the serving eNB considers measurements from cells in the PLMN when determining whether to handover the UE, add a carrier for the UE in carrier aggregation, etc. For example, a cell can transmit an eDRS according to a certain periodic or quasi-periodic pattern, using certain configured resources, using a certain timing, etc., which can be used to detect eDRSs from cells in the same PLMN as a serving cell based on measurements performed by a UE.

Differentiating between eDRSs of cells in the same PLMN and those in other PLMNs as described above and further herein may allow for avoiding handover and/or carrier addition in carrier aggregation to cells in a different PLMN. This can be beneficial over other approaches, such as physical cell identifier (PCI) partitioning where network operators partition PCIs within an area so PCI confusion is avoided, as this approach may require network planning and may not be scalable as new cells are added. Moreover, aspects described herein can be beneficial over using system information broadcasting to indicate PLMN, for example, as this may require UEs to read additional system information for every cell detected, which requires additional processing/complexity associated with decoding the additional system information, allocation of a radio network temporary identifier (RNTI) for reading system information, etc.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a communicating component 602 configured to transmit eDRSs to one or more UEs 115, and/or to configure UEs 115 to receive and process eDRSs from other access points 105 in one or more PLMNs. UEs 115 can include a communicating component 661 for receiving eDRSs from one or more access points 105 and/or configurations related to receiving and processing the eDRSs for measuring eDRSs associated with one or more access points 105 in the same PLMN as a serving access point 105.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. It is to be appreciated that there can be a PCell for each communication link 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell can cover a relatively large geographic area (e.g., several kilometers in radius) and may allow unrestricted access by UEs 115 with service subscriptions with the network provider. A small cell can cover a relatively smaller geographic area relative to a macro cell. Further, a small cell may allow unrestricted access by UEs 115 with service subscriptions with the network provider, for example, and/or may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells. The term eNB, as used generally herein, may relate to a macro eNB and/or a small cell eNB. In an example, a small cell may operate in an "unlicensed" frequency band or spectrum, which can refer to a portion of radio frequency (RF) space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum. In addition, for illustration purposes, the description below may refer in some respects to an LTE system operating on an unlicensed band by way of example when appropriate, although it is to be appreciated that such descriptions are not intended to exclude other cellular communication technologies. LTE on an unlicensed band may also be referred to herein as LTE/LTE-Advanced in unlicensed spectrum, or simply LTE, in the surrounding context.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, small cell eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of one or more hierarchical layers which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Other features and functions related to communications in such systems, are provided below with reference to the following figures.

Figure 2:
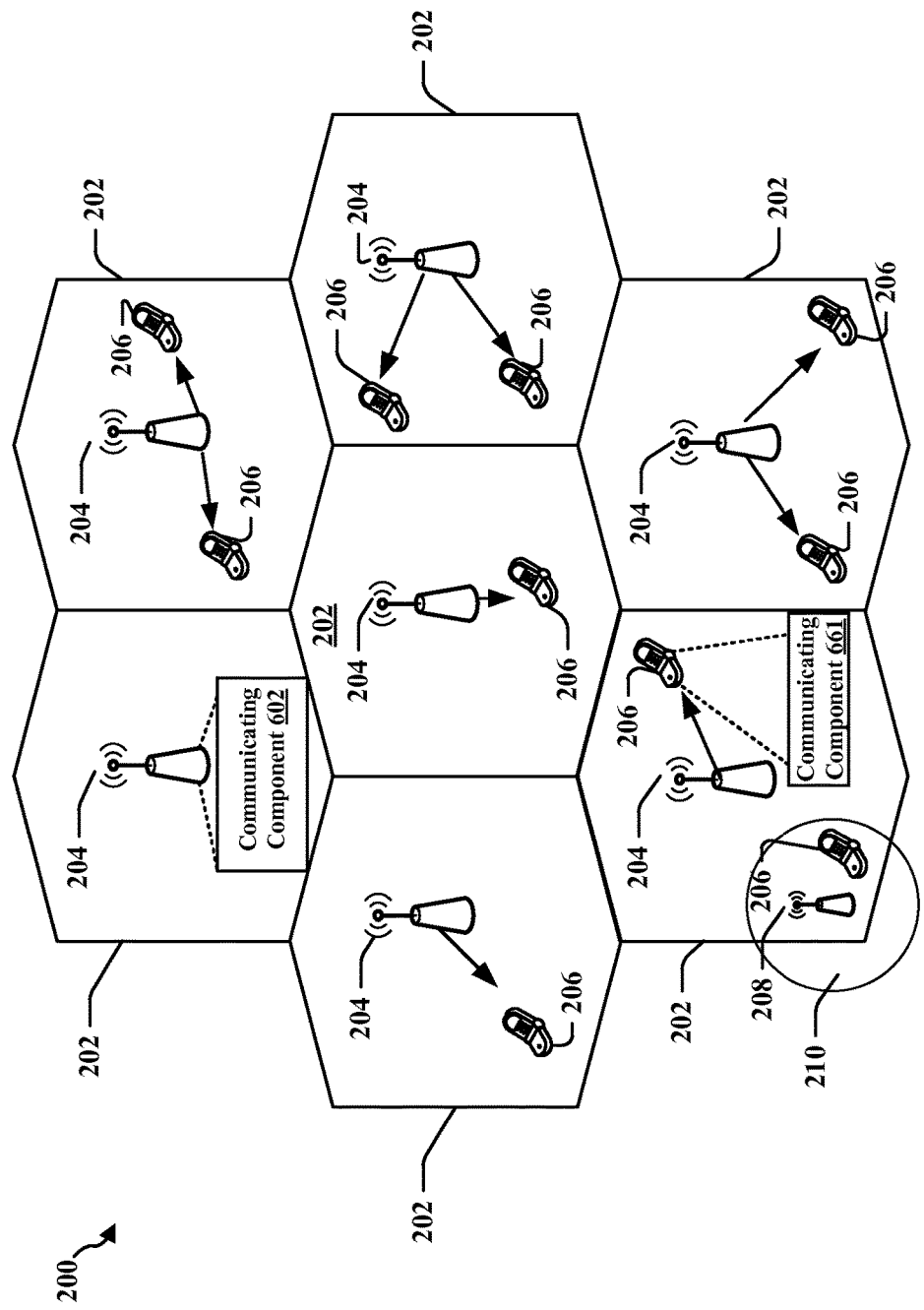
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 may have cellular regions 210 that overlap with one or more of the cells 202. The small cell eNB 208 may provide a small cell (e.g., home eNB (HeNB)), femto cell pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or small cell eNBs 208 may include a communicating component 602 configured to transmit eDRSs to one or more UEs 206, and/or to configure UEs 206 to receive and process eDRSs from other eNBs 204 and/or small cell eNBs 208 in one or more PLMNs. UEs 206 may include a communicating component 661 for receiving eDRSs to determine eDRSs from one or more eNBs 204 and/or small cell eNBs 208, and/or receiving configurations related to receiving and processing the eDRSs in the same PLMN as a serving eNB 204 or small cell eNB 208. There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
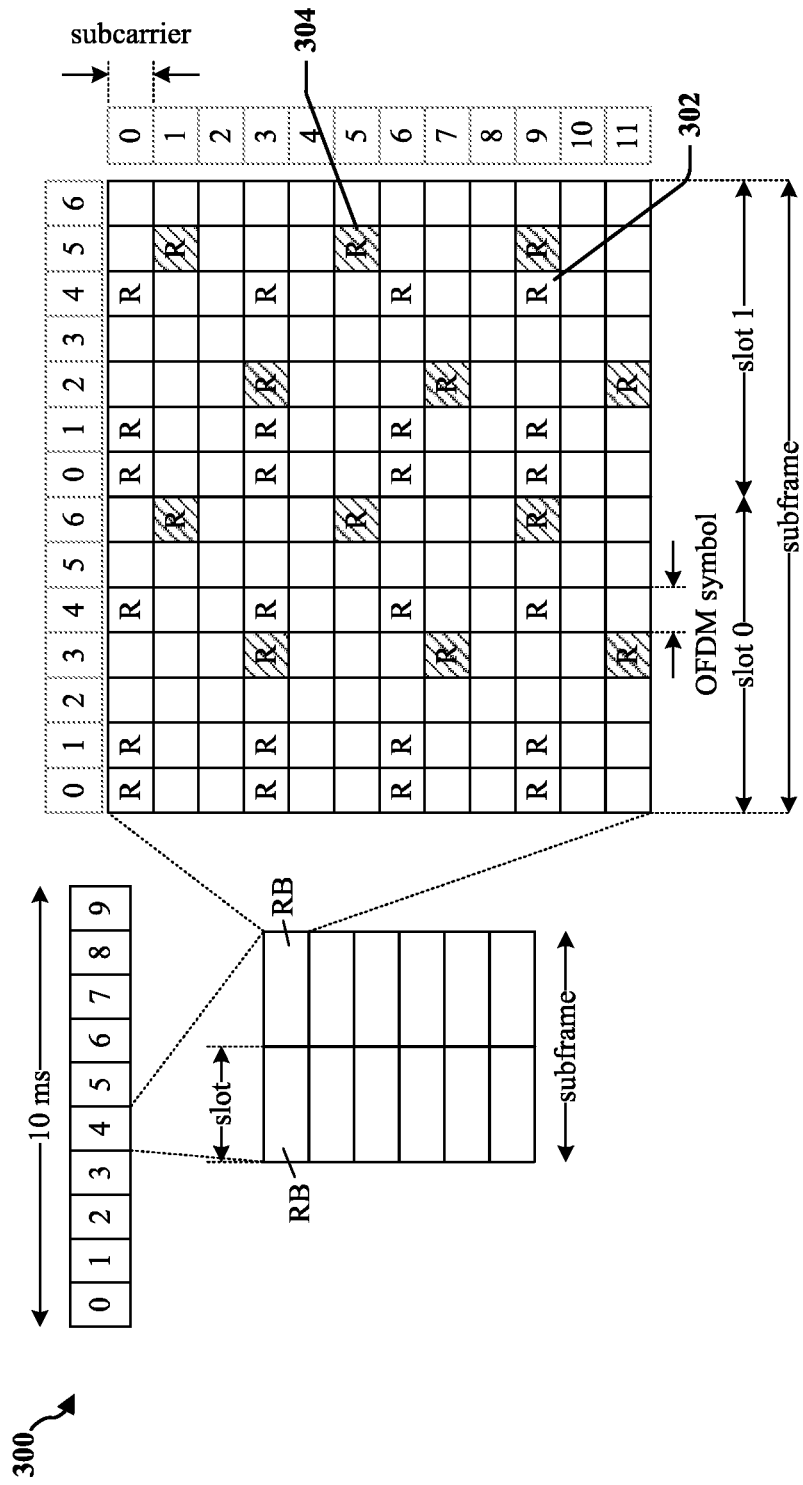
FIG. 3 is a diagram illustrating an example of a downlink (DL) frame structure in long term evolution (LTE).

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (also sometimes called common RS) 302 and UE-specific RS (UE-RS) 304. UE-RS 304 are transmitted only on the resource element blocks upon which the corresponding physical downlink shared channel (PDSCH) is mapped. The number of bits carried by each resource element depends on the modulation scheme. Thus, the more resource element blocks that a UE receives and the higher the modulation scheme, the higher the data rate for the UE.

Figure 4:
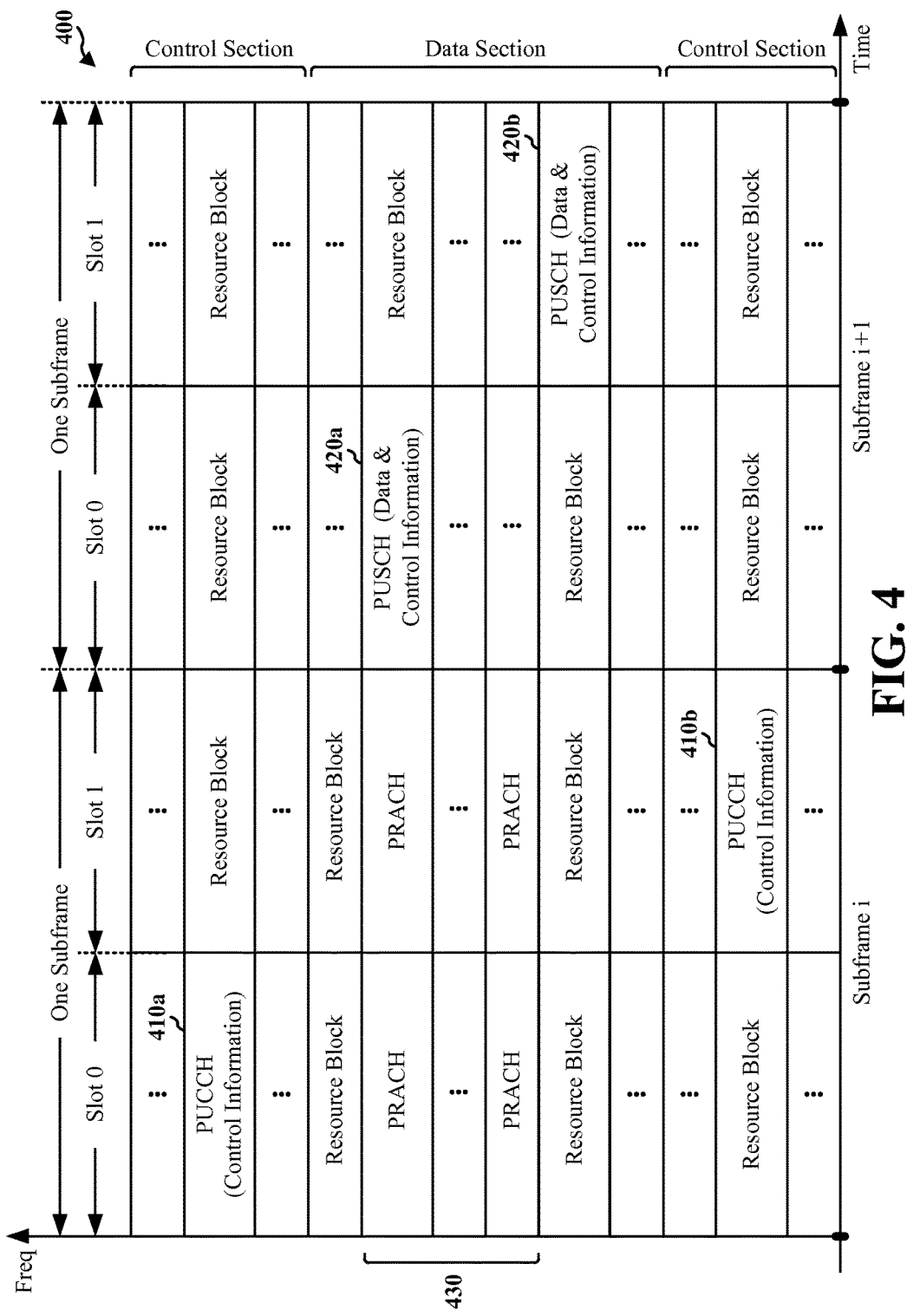
FIG. 4 is a diagram illustrating an example of an uplink (UL) frame structure in LTE.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
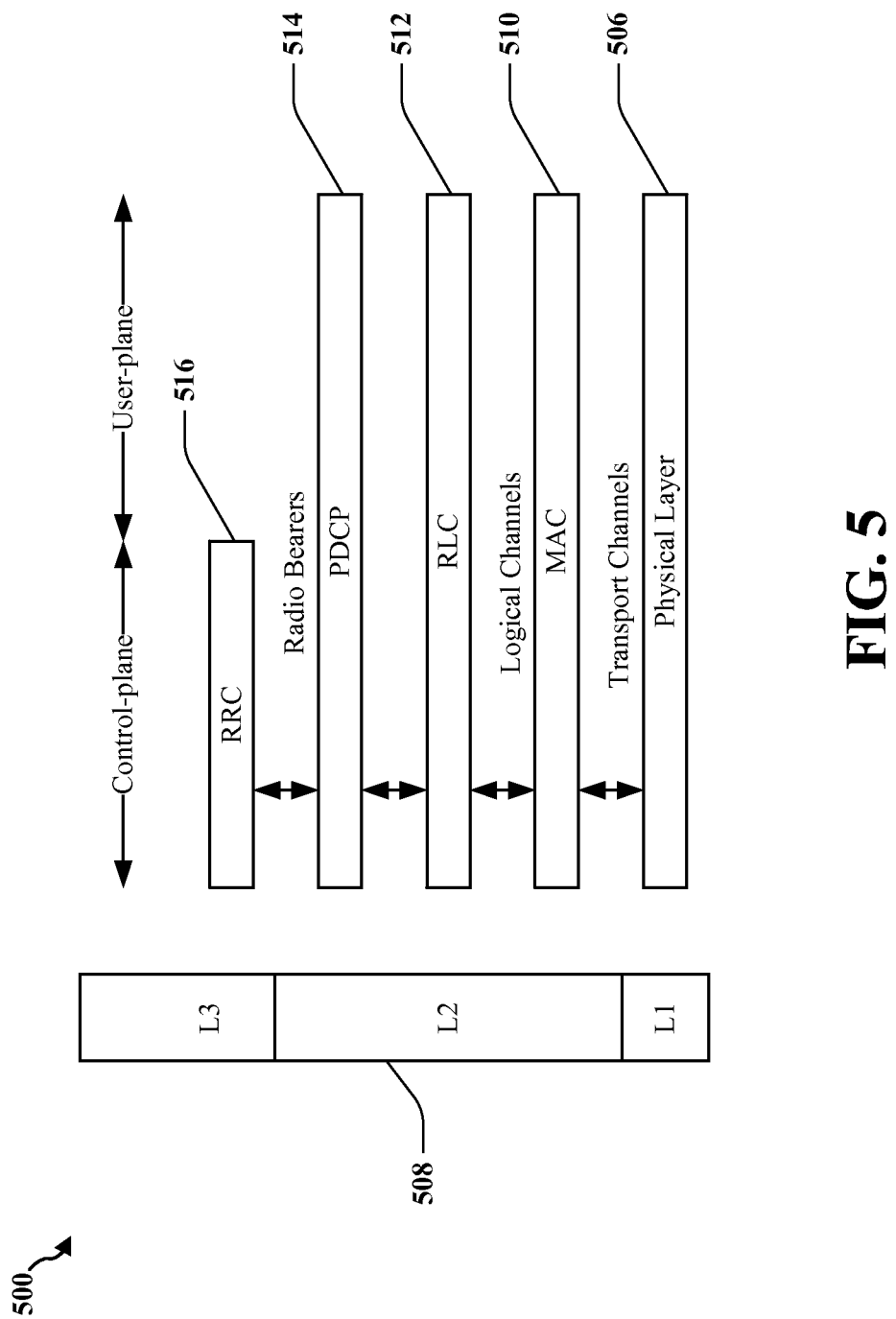
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at a PDN gateway on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
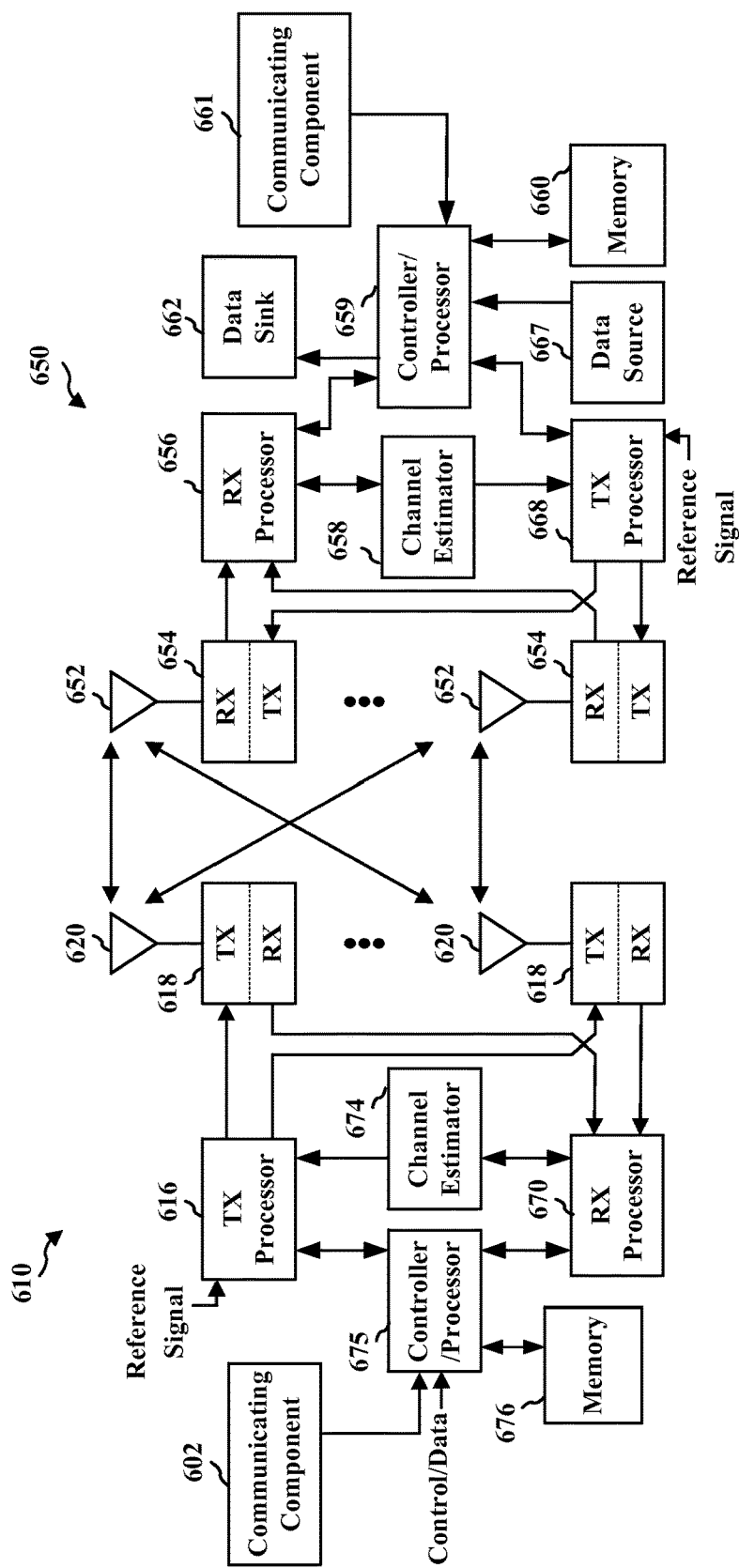
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a communicating component 602 configured to transmit eDRSs to one or more UEs 650, and/or to configure UEs 650 to receive and process eDRSs from other eNBs in one or more PLMNs. Though shown as coupled to controller/processor 675, it is to be appreciated that the communicating component 602 and/or related components or functions, can each be executed by, implemented by, etc., substantially any processor of eNB 610, including TX processor 616, RX processor 670, controller/processor 675, etc., and/or memory 676 can store instructions and/or related parameters for performing the functions.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a communicating component 661 for receiving eDRSs to determine eDRSs from one or more eNBs 610 and/or configurations related to receiving and processing the eDRSs in the same PLMN as a serving eNB 610. Though shown as coupled to controller/processor 659, it is to be appreciated that the communicating component 661 and/or related components or functions, can each be executed by, implemented by, etc., substantially any processor of UE 650, including TX processor 668, RX processor 656, controller/processor 659, etc., and/or memory 660 can store instructions and/or related parameters for performing the functions.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
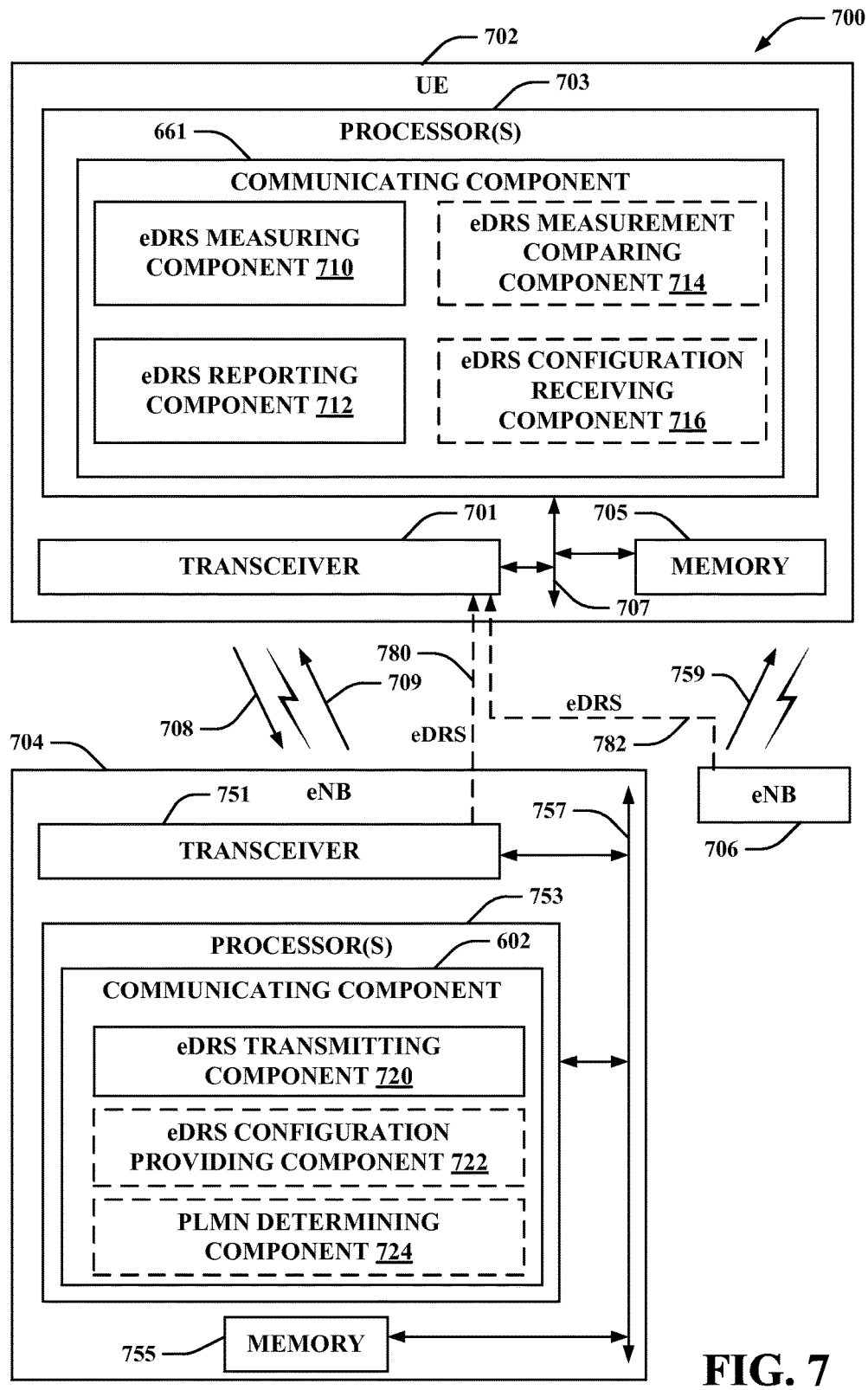
FIG. 7 is a diagram illustrating an example system for communicating enhanced discovery reference signals (eDRS) in accordance with aspects described herein.
Figure 8:
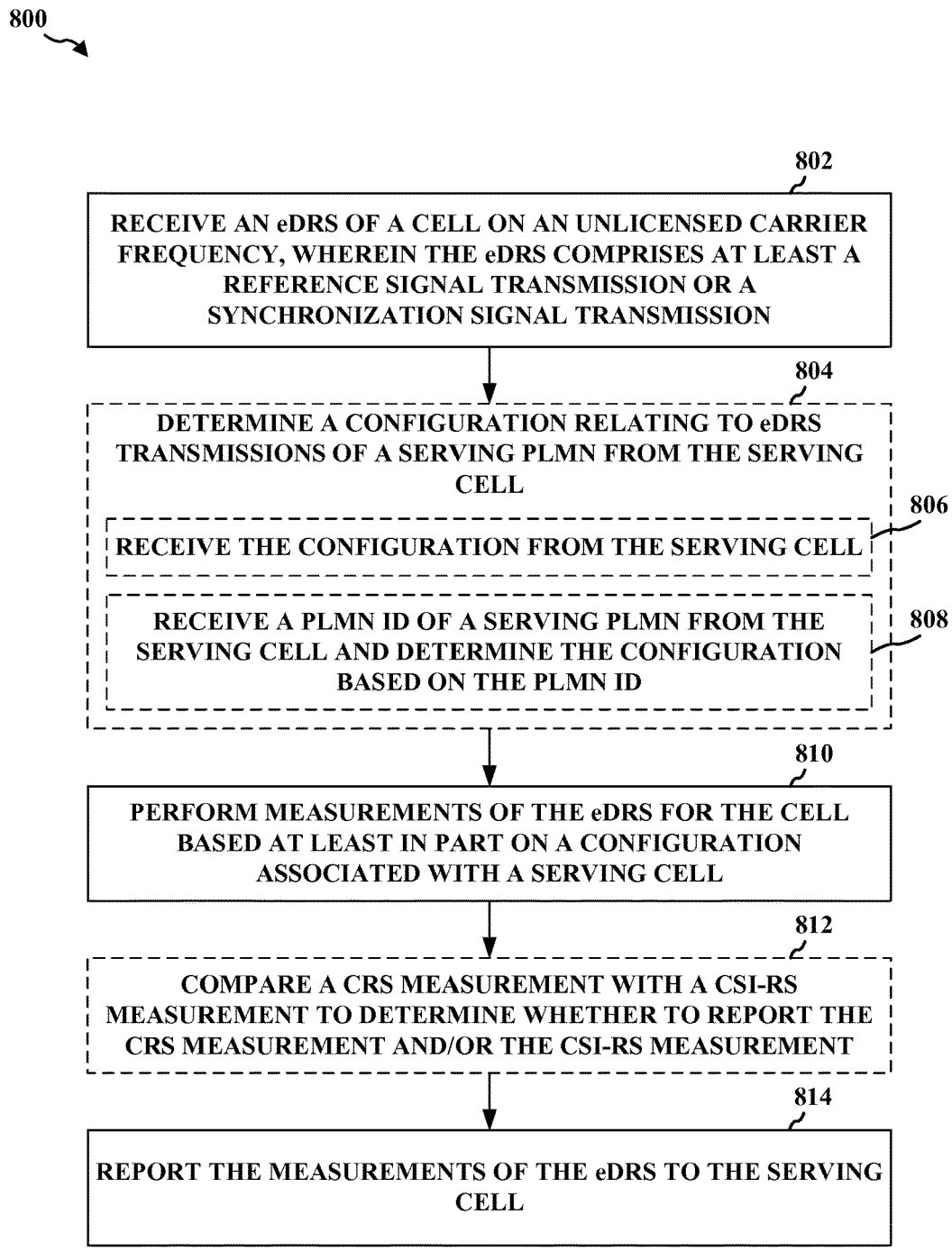
FIG. 8 is a flow chart of an example method for receiving and reporting measurements of eDRSs.
Figure 9:
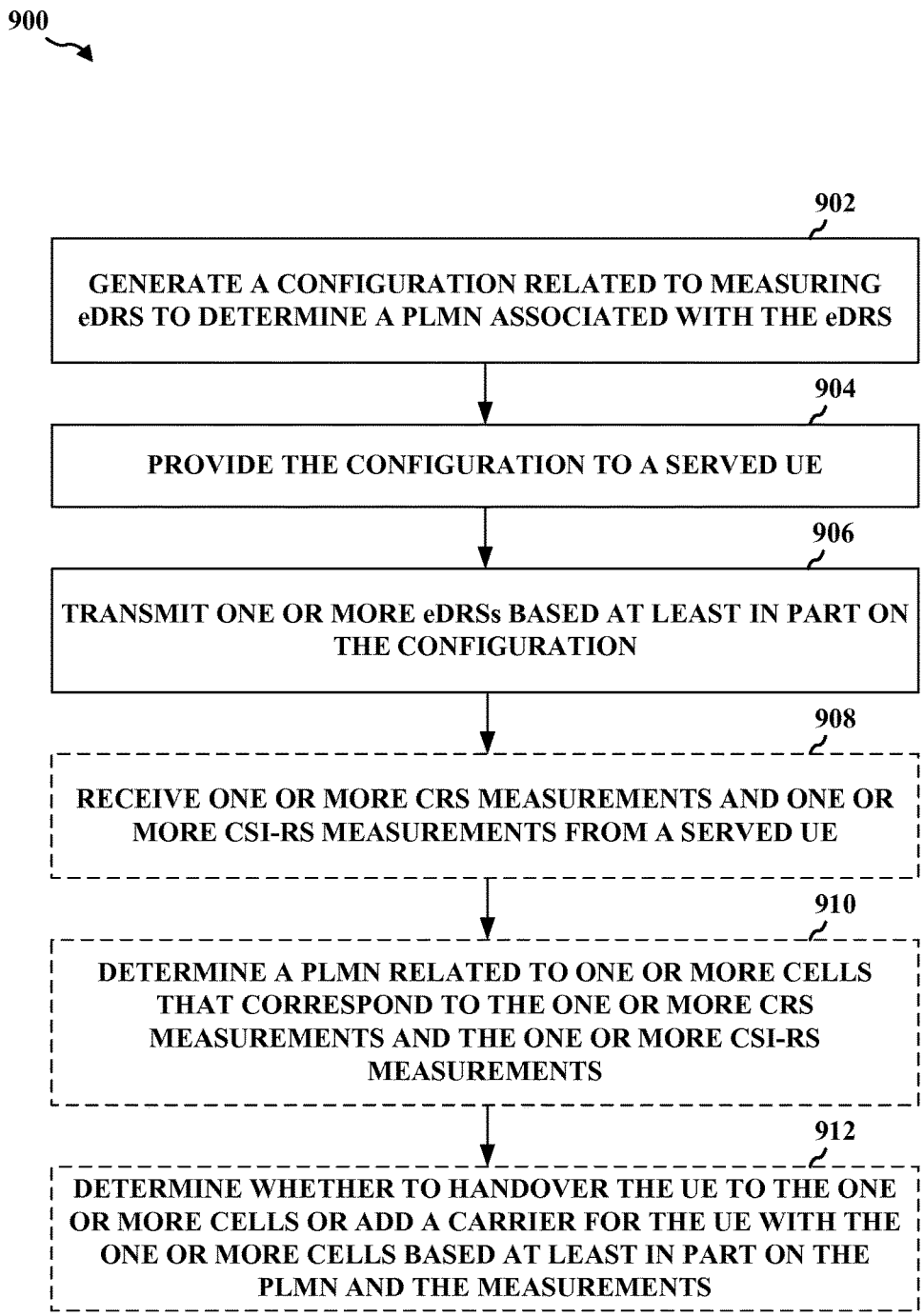
FIG. 9 is a flow chart of an example method for transmitting eDRSs and/or receiving measurements thereof.

Referring to FIGS. 7-9, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 8 and 9 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 7 illustrates an example system 700 for measuring eDRSs from one or more cells in a network, which may, for example, enable measuring cells associated with one or more desired PLMNs. System 700 includes a UE 702 that communicates with an eNB 704 in one or more cells provided by the eNB 704, and/or eNB 706 in one or more cells provided thereby, to access a wireless network. As described, eNBs 704 and/or 706 may each be a small cell eNB providing one or more small cells and operating in an unlicensed spectrum. In this example, ensuring the small cells are part of the same PLMN can be beneficial for purposes of adding a carrier (e.g., an SCell carrier) associated with cell or a neighboring cell, handing over to the cell or a neighboring cell, etc. In one example, the eNBs 704 and/or 706 may provide a cell that is serving the UE 702 and/or another cell with which the UE 702 may consider for communicating (e.g., via handover). In a specific example, eNB 704 may be a PCell, and eNB 706 may be considered for establishing as an SCell of the UE 702.

System 700 includes a UE 702 that communicates with an eNB 704 to access a wireless network, examples of which are described in FIGS. 1, 2, and 6 (e.g., access points 105, eNB 204, small cell eNB 208, eNB 610, UEs 115, 206, 650, etc.), above. In an aspect, eNB 704 and UE 702 may have established one or more downlink channels over which to communicate via downlink signals 709, which can be transmitted by eNB 704 (e.g., via transceiver 751) and received by UE 702 (e.g., via transceiver 701) for communicating control and/or data messages (e.g., in signaling) from the eNB 704 to the UE 702 over configured communication resources. Moreover, for example, eNB 704 and UE 702 may have established one or more uplink channels over which to communicate via uplink signals 708, which can be transmitted by UE 702 (e.g., via transceiver 701) and received by eNB 704 (e.g., via transceiver 751) for communicating control and/or data messages (e.g., in signaling) from the UE 702 to the eNB 704 over configured communication resources. eNB 704 and UE 702 may have established such communication resources such that eNB 704 can provide a serving cell for UE 702 to access a core network, as described. In another example, UE 702 can receive and measure downlink signals 709 (e.g., reference signals), such as an eDRS 780, from eNB 704 (e.g., without necessarily being served by eNB 704). Similarly, eNB 706 can communicate downlink signals 759, which may include an eDRS 782 that the UE 702 can measure. It is to be appreciated, however, that eNB 706 may additionally or alternatively serve UE 702 and thus may include one or more components of eNB 704, as described herein. In this example, however, such components are omitted from eNB 706 for ease of explanation.

In an aspect, UE 702 may include one or more processors 703 and/or a memory 705 that may be communicatively coupled, e.g., via one or more buses 707, and may operate in conjunction with or otherwise implement a communicating component 661 for receiving, measuring, and/or otherwise processing eDRSs transmitted in the cell by the eNBs 704 and/or 706. For example, the various operations related to communicating component 661 may be implemented or otherwise executed by one or more processors 703 and, in an aspect, can be executed by a single processor, while in other aspects, different ones of the operations may be executed by a combination of two or more different processors. For example, in an aspect, the one or more processors 703 may include any one or any combination of a modem processor, or a baseband processor, or a digital signal processor, or an application specific integrated circuit (ASIC), or a transmit processor, receive processor, or a transceiver processor associated with transceiver 701. Further, for example, the memory 705 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 703. Moreover, memory 705 or computer-readable storage medium may be resident in the one or more processors 703, external to the one or more processors 703, distributed across multiple entities including the one or more processors 703, etc.

In particular, the one or more processors 703 and/or memory 705 may execute actions or operations defined by communicating component 661 or its subcomponents. For instance, the one or more processors 703 and/or memory 705 may execute actions or operations defined by an eDRS measuring component 710 for measuring one or more eDRSs received from the one or more cells (provided by one or more eNBs). In an aspect, for example, eDRS measuring component 710 may include hardware (e.g., one or more processor modules of the one or more processors 703) and/or computer-readable code or instructions stored in memory 705 and executable by at least one of the one or more processors 703 to perform the specially configured signal measuring operations described herein. Further, for instance, the one or more processors 703 and/or memory 705 may execute actions or operations defined by an eDRS reporting component 712 for reporting eDRS measurements or other aspects of a received eDRS signal to a serving cell (provided by a serving eNB). In an aspect, for example, eDRS reporting component 712 may include hardware (e.g., one or more processor modules of the one or more processors 703) and/or computer-readable code or instructions stored in memory 705 and executable by at least one of the one or more processors 703 to perform the specially configured reference signal reporting operations described herein.

Further, for instance, the one or more processors 703 and/or memory 705 may optionally execute actions or operations defined by an eDRS measurement comparing component 714 for comparing measurements of one or more eDRSs to determine whether to report the measurements. In an aspect, for example, eDRS measurement comparing component 714 may include hardware (e.g., one or more processor modules of the one or more processors 703) and/or computer-readable code or instructions stored in memory 705 and executable by at least one of the one or more processors 703 to perform the specially configured reference signal measurement and/or comparing operations described herein. Additionally, for instance, the one or more processors 703 and/or memory 705 may optionally execute actions or operations defined by an eDRS configuration receiving component 716 for obtaining a configuration of eDRS transmissions associated with a PLMN to measure and report eDRSs that are common for cells in the PLMN. In an aspect, for example, eDRS configuration receiving component 716 may include hardware (e.g., one or more processor modules of the one or more processors 703) and/or computer-readable code or instructions stored in memory 705 and executable by at least one of the one or more processors 703 to perform the specially configured configuration receiving operations described herein.

Similarly, in an aspect, eNB 704 may include one or more processors 753 and/or a memory 755 that may be communicatively coupled, e.g., via one or more buses 757, and may operate in conjunction with or otherwise implement a communicating component 602 for transmitting eDRSs to one or more UEs, and/or configuring UEs to receive and process eDRSs from other eNBs in one or more PLMNs. For example, the various functions related to communicating component 602 may be implemented or otherwise executed by one or more processors 753 and, in an aspect, can be executed by a single processor, while in other aspects, different ones of the functions may be executed by a combination of two or more different processors, as described above. It is to be appreciated, in one example, that the one or more processors 753 and/or memory 755 may be configured as described in examples above with respect to the one or more processors 703 and/or memory 705 of UE 702.

In an example, the one or more processors 753 and/or memory 755 may execute actions or operations defined by communicating component 602 or its subcomponents. For instance, the one or more processors 753 and/or memory 755 may execute actions or operations defined by an eDRS transmitting component 720 for transmitting one or more eDRSs, which may be transmitted according to a configuration specific to a PLMN of the eNB 704 or a related cell. In an aspect, for example, eDRS transmitting component 720 may include hardware (e.g., one or more processor modules of the one or more processors 753) and/or computer-readable code or instructions stored in memory 755 and executable by at least one of the one or more processors 753 to perform the specially configured reference signal transmitting operations described herein. Further, for instance, the one or more processors 753 and/or memory 755 may optionally execute actions or operations defined by an eDRS configuration providing component 722 for providing a configuration for receiving eDRSs to one or more UEs. In an aspect, for example, eDRS configuration providing component 722 may include hardware (e.g., one or more processor modules of the one or more processors 753) and/or computer-readable code or instructions stored in memory 755 and executable by at least one of the one or more processors 753 to perform the specially configured configuration providing operations described herein. Further, for instance, the one or more processors 753 and/or memory 755 may optionally execute actions or operations defined by a PLMN determining component 724 for determining a PLMN associated with eDRS measurements received from one or more UEs. In an aspect, for example, PLMN determining component 724 may include hardware (e.g., one or more processor modules of the one or more processors 753) and/or computer-readable code or instructions stored in memory 755 and executable by at least one of the one or more processors 753 to perform the specially configured PLMN determining operations described herein.

It is to be appreciated that transceivers 701, 751 may be configured to transmit and receive wireless signals through one or more antennas, an RF front end, one or more transmitters, and one or more receivers. In an aspect, transceivers 701, 751 may be tuned to operate at specified frequencies such that UE 702 and/or eNB 704 can communicate at a certain frequency. In an aspect, the one or more processors 703 may configure transceiver 701 and/or one or more processors 753 may configure transceiver 751 to operate at a specified frequency and power level based on a configuration, a communication protocol, etc. to communicate uplink signals 708 and/or downlink signals 709, respectively, over related uplink or downlink communication channels.

In an aspect, transceivers 701, 751 can operate in multiple bands (e.g., using a multiband-multimode modem, not shown) such to process digital data sent and received using transceivers 701, 751. In an aspect, transceivers 701, 751 can be multiband and be configured to support multiple frequency bands for a specific communications protocol. In an aspect, transceivers 701, 751 can be configured to support multiple operating networks and communications protocols. Thus, for example, transceivers 701, 751 may enable transmission and/or reception of signals based on a specified modem configuration. As described, it is to be appreciated that eNB 706 can similarly include a transceiver configured to operate in this regard.

Generally, eNBs can utilize discovery reference signals (DRS) to allow UEs to discover of the eNBs, which can help the eNBs manage an ON/OFF procedure to determine whether to turn on or off based on detecting surrounding eNBs and related signal strengths (e.g., to provide additional coverage or avoid interfering with the other eNBs, respectively). eNBs can generate DRSs for one or more cells provided by the eNBs, which can relate to one or more sectors, component carriers, etc. UEs can utilize the DRSs to discover the cells transmitting DRS, and the UEs may thus begin processing other signals from one or more of the cells once the DRS is detected and/or once a positioning reference signal (PRS) of a corresponding cell is received and processed by communicating component 661. In an example, DRSs can include one or more reference signals, such as a common reference signal (CRS), primary synchronization signal (PSS), secondary synchronization signal (SSS), channel state information reference signal (CSI-RS), and/or the like.

Accordingly, as explained above, eDRSs may be defined as being similar to DRSs, in some examples, with some differences. For instance, DRS may be periodic and not subject to listen-before-talk (LBT) or clear channel assessment (CCA) often required of eDRSs in radio access technologies over unlicensed spectrums. Further, for instance, eDRSs may have mandatory CSI-RS that may be explicitly or implicitly linked to the PLMN ID, etc.

In any case, as described further herein, eNBs 704 and/or 706 can transmit DRSs as eDRSs and can configure UE 702 to measure eDRSs of cells that are in the same PLMN or to otherwise report certain eDRS measurements to allow the eNB 704 to determine which reported measurements relate to cells in the PLMN. Identifying the PLMN in this regard can ensure interoperability among identified cells for the purposes of handover, adding carriers (e.g., adding an SCell to an established PCell in carrier aggregation), etc.

FIG. 8 illustrates a method 800 for reporting received eDRSs according to a configuration. Method 800 of FIG. 8 will now be discussed in conjunction with the example architecture and components of UE 702 and eNB 704 (and, similarly, eNB 706) of the example system 700 of FIG. 7. Method 800 includes, at Block 802, receiving an eDRS of a cell on an unlicensed carrier frequency, wherein the eDRS comprises at least a reference signal transmission or a synchronization signal transmission. In an aspect, communicating component 661 of UE 702 (FIG. 7) can receive the eDRS of the cell on the unlicensed carrier frequency. For example, UE 702 may be served by eNB 704 or an associated cell, and communicating component 661, e.g., operating in conjunction with processor 703 and memory 705, may receive via transceiver 701 the eDRS 782 from eNB 706 or an associated cell (and/or an eDRS 780 from eNB 704). As described, the eDRS 782 (and/or 780) can include a PSS, SSS, CRS, and/or CSI-RS transmission from eNB 706 (and/or eNB 704) that eNB 706 (and/or eNB 704) transmits to facilitate discovery of eNB 706 (and/or eNB 704) by one or more UEs.

Method 800 may optionally include, at Block 804, determining a configuration relating to eDRS transmissions of a serving PLMN from the serving cell. In an aspect, eDRS configuration receiving component 716, e.g., operating in conjunction with one or more processors 703 and memory 705, can determine the configuration relating to eDRS transmissions of the serving PLMN from the serving cell (e.g., a cell provided by eNB 704). For example, eNB 704 may operate eDRS configuration providing component 722, e.g., in conjunction with processor 753 and memory 755, to provide the configuration to the UE 702 specifying one or more parameters of eDRS transmissions by eNB 704 and other eNBs in the same serving PLMN. Thus, determining the configuration at Block 804 may optionally include, at Block 806, receiving the configuration from the serving cell. In an aspect, eDRS configuration receiving component 716, e.g., operating in conjunction with one or more processors 703 and memory 705, can receive the configuration from the serving cell. For example, the configuration may specify the one or more parameters such as a PCI, a subframe offset, a resource index of the eDRS includes CSI-RS transmissions, a scrambling identifier of the eDRS, or similar measurable parameter of the signal. As described further herein, these parameters can then be used to identify eDRSs transmitted by eNBs in a PLMN for which the configuration is specified. In an example, UE 702 may operate eDRS reporting component 712, e.g., in conjunction with one or more processors 703 and memory 705, to report eDRS measurements for the eNBs in the identified PLMN.

In another example, determining the configuration at Block 804 may optionally include, at Block 808, receiving a PLMN ID of a serving PLMN from the serving cell and determining the configuration based on the PLMN ID. In an aspect, eDRS configuration receiving component 716, e.g., operating in conjunction with one or more processors 703 and memory 705, can receive via transceiver 701 the PLMN ID of the serving PLMN from the serving cell (e.g., a cell provided by eNB 704) and may determine the configuration based on the PLMN ID. In this example, eDRS configuration providing component 722, e.g., in conjunction with one or more processors 753 and memory 755, can transmit the PLMN ID to UE 702. eDRS configuration receiving component 716 may store (e.g., in memory 705) a list of PLMN IDs and corresponding configurations of eDRS parameters, which may be received from eNB 704 or another network entity. In this regard, eDRS configuration receiving component 716, e.g., operating in conjunction with one or more processors 703 and memory 705, can determine the one or more parameters for identifying eDRSs of the specified PLMN ID based on the received PLMN ID and the parameters stored in memory 705. In this example, UE 702 may similarly operate eDRS reporting component 712, e.g., in conjunction with one or more processors 703 and memory 705, to report eDRS measurements for the eNBs in the identified PLMN.

Method 800 also includes, at Block 810, performing measurements of the eDRS for the cell based at least in part on a configuration associated with a serving cell. In an aspect, eDRS measuring component 710, e.g., in conjunction with one or more processors 703 and memory 705, can perform the measurements of the eDRS for the cell based at least in part on a configuration associated with a serving cell. For example, eDRS measuring component 710 can measure one or more parameters related to the eDRS received by communicating component 661 from eNB 706 in the related cell. The one or more parameters may include parameters to enable identifying a source of the DRS, such as a subframe offset, resource index, scrambling identifier, or similar measurable parameter of the signal, as described above. In another example, the one or more parameters may additionally or alternatively include radio resource management (RRM) measurement parameters, such as a signal strength of the eDRS (e.g., a received signal strength indicator (RSSI), reference signal received power (RSRP), reference signal received quality (RSRQ), etc.) for considering the corresponding eNB or cell as a candidate for handover and/or addition of a carrier in carrier aggregation. Thus, eDRS measuring component 710 can determine one or more such parameters of the signal based on observing characteristics of the received and/or decoded eDRS.

Method 800 optionally includes, at Block 812, comparing a CRS measurement with a CSI-RS measurement to determine whether to report the CRS measurement and/or the CSI-RS measurement. In an aspect, eDRS reporting component 712, e.g., in conjunction with one or more processors 703 and memory 705, can compare the CRS measurement with the CSI-RS measurement to determine whether to report the CRS measurement and/or the CSI-RS measurement. For example, eNB 706 can transmit eDRSs as CRS and as CSI-RS. eDRS measuring component 710 can receive and measure CSI-RSs from one or more cells or eNBs, and CRSs. For example, eDRS measuring component 710 can receive CSI-RS transmissions based on one or more parameters for a serving PLMN (e.g., subframe offset, resource index, scrambling identifier, etc., as described), which can also indicate a PCI. Where eDRS measuring component 710 also receives a CRS with the same PCI, eDRS reporting component 712 can compare measurement of the CSI-RS and CRS to determine whether to consider the cell or eNB corresponding to the CRS for handover and/or carrier addition (e.g., whether to report the CSI-RS and CRS to the serving eNB 704). For example, eDRS reporting component 712 may consider the cell or eNB for handover and/or carrier addition where the CSI-RS and CRS measurements are within a threshold difference (e.g., which can indicate that the CSI-RS and CRS likely came from the same eNB). For example, the threshold difference can be a small number of decibels (dBs) (e.g., 5 dBs or less).

Method 800 also includes, at Block 814, reporting the measurements of the eDRS to the serving cell. For example, eDRS reporting component 712, e.g., in conjunction with one or more processors 703 and memory 705, may report the measurements of the eDRSs (e.g., from eNB 706 or related cell) to the serving cell (e.g., a serving cell provided by eNB 704). For instance, eDRS reporting component 712 can report all measurements and/or measurements corresponding to a CSI-RS measurement and a CRS measurement for a PCI that are within a threshold difference, as described with respect to optional Block 812 above. In another example, as described further herein, eNB 704 can receive all measurements and can determine CSI-RS and CRS related to a PCI based on determining a threshold difference in the measurements. In any case, as described, a handover determination, a determination to add a carrier as an SCell in carrier aggregation or multiple connectivity, etc., can be made of eNB 706 or a related cell based on the reported measurements. For example, communicating component 661, e.g., in conjunction with one or more processors 703 and memory 705, of UE 702 and/or communicating component 602, e.g., in conjunction with one or more processors 753 and memory 755, of eNB 704 may include a determination component having determination logic used to make the determination to handover, add a carrier, etc. By configuring the UE 702 to report eDRS measurements related to the PLMN in this regard, the eNB 704 can consider cells in the same PLMN for the handover determination, determination to add a carrier, etc.

In one example, eDRS measuring component 710 can perform measurements of one or more CSI-RSs (referred to as CSI-RS measurements) as well as measurements of one or more CRSs (referred to as CRS measurements). eDRS reporting component 712 may provide the CSI-RS and CRS measurements to eNB 704. For example, eDRS measuring component 710 may receive and measure eDRSs from eNB 706 or a related cell. In this example, communicating component 602 can receive the CSI-RS and CRS measurements from UE 702, and PLMN determining component 724 can determine a PLMN related to one or more cells that correspond to the signals. In an example, PLMN determining component 724 can compare the measurements (e.g., signal strength) of the CSI-RS and CRS, and can link CSI-RSs and CRSs having similar measurements. PLMN determining component 724 can then determine whether the linked CSI-RS and CRS measurements relate to the same cell (e.g., based on a PCI in the CRS and CSI-RS as well as based on the measurements), and if so, eNB 704 can consider the measurements in determining whether to handover UE 702 to a measured cell in the PLMN (e.g., a cell of eNB 706) based on the measurements (e.g., where the measurements achieve a threshold, achieve a threshold difference from those of the serving cell, achieve the threshold when measurements from the serving cell are below a threshold, etc.), add a carrier to a connection with UE 702 via a measured cell in the PLMN (e.g., a cell of eNB 706), etc. Additionally, in this example as described, eDRS configuration providing component 722 may provide a configuration to UE 702 to request the UE 702 to report CSI-RS and CRS measurements detected from one or more cells. eDRS configuration receiving component 716 can receive the configuration, and eDRS reporting component 712 can accordingly report measurements of CSI-RS and CRS signals.

In another example, eDRS measurement comparing component 714 can compare the measured CSI-RSs to the CRSs to determine relative differences thereof, and eDRS reporting component 712 can report measurements that are within a threshold difference to the serving cell (e.g., to eNB 704) for determining measurements that correspond to a PLMN of the serving cell, as described with respect to Block 812 above. This can similarly be based on eDRS configuration providing component 722 configuring the UE 702 to compare measurements before reporting the measurements to the eNB 704. For example, eDRS configuration providing component 722 can provide one or more parameters to the UE 702 to cause the UE 702 to perform the comparing before sending the measurements. eDRS configuration receiving component 716 can receive the configuration and accordingly operate to compare measurements before sending.

This can reduce signaling required of the UE 702 to communicate the measurements to the serving cell.

In another specific example, eNB 706 may transmit the eDRS, which can include eNB 706 transmitting a reference signal, such as CSI-RS, using resources that can be commonly used by eNBs (or related cells) in a specific PLMN. In this regard, for example, the resources used for the CSI-RS transmission can identify the associated PLMN. In this example, eDRS configuration providing component 722 can configure UE 702 for receiving CSI-RS over certain resources corresponding to the PLMN. eDRS configuration receiving component 716 can receive the CSI-RS configuration from eNB 704. Accordingly, eDRS measuring component 710 can measure CSI-RSs received over configured resources. In an example, eDRS measuring component 710 may measure a CSI-RS received from eNB 706 over the resources, and eDRS reporting component 712 can report the CSI-RS measurements to eNB 704 or a related serving cell provided by eNB 704 for considering eNB 706 for handover, addition of an SCell, etc.

For example, eNB 706 can utilize a certain subframe offset (e.g., from a related PSS) for transmitting the CSI-RS, one or more certain resource indices (e.g., indices of resource elements and/or one or more resource blocks of an OFDM symbol corresponding to the CSI-RS transmission) related to the CSI-RS, a scrambling identifier used to scramble the CSI-RS signal, etc. eDRS configuration providing component 722 can specify these parameters of the CSI-RS in configuring the UE 702 for eDRS measurement. In this example, eDRS configuration receiving component 716 can receive the parameters such as subframe offset, resource indices, scrambling identifier, etc., and eDRS measuring component 710 can use the parameters in detecting/measuring eDRSs received from eNB 706 and/or other eNBs. Thus, eDRSs reported by eDRS reporting component 712 can include eDRSs of the same PLMN as the serving cell for UE 702 (e.g. a cell provided by eNB 704).

In another example, eDRS configuration providing component 722 can provide the PLMN identifier to the UE 702, which eDRS configuration receiving component 716 can receive and use to determine the configuration parameters for eDRSs associated with the PLMN (e.g., the subframe offset, resource indices, scrambling identifier, etc.), as described. In this example, UE 702 may store one or more PLMN identifiers and related eDRS configuration parameters, which can be stored in a repository on the UE 702 (e.g., in persistent storage such as a memory card, subscriber identity module, etc., in a non-persistent memory storage, etc.), received in a network configuration, and/or the like.

In yet another specific example, eNB 706 can transmit synchronization signals, such as PSS, SSS, etc. and/or reference signals such as CRS, CSI-RS, etc., according to one or more parameters configured for cells of a PLMN. For example, eNB 706 may transmit the signals periodically (e.g., in certain subframes, over certain symbols in each subframe, etc.), quasi-periodically (e.g., in certain subframes within a transmission window, over certain symbols in each subframe in the transmission window, etc. where the transmission window is periodic), and/or the like. Thus, in an example, eDRS configuration providing component 722 can provide parameters of the configuration used to transmit synchronization or reference signals in the PLMN of eNB 704. Accordingly, eDRS configuration receiving component 716 can receive the configuration, and eDRS measuring component 710 can measure the synchronization signals and/or reference signals received over the resources based on the configuration (e.g., synchronization signals and/or reference signals having determined properties that correspond to the one or more parameters). Accordingly, eDRS reporting component 712 reports measurements of signals received from cells in the PLMN configured by eDRS configuration providing component 722. In another example, as similarly described above, eDRS configuration providing component 722 can provide a PLMN identifier to the UE 702, from which eDRS configuration receiving component 716 can determine a configuration and one or more related parameters for the synchronization or reference signal transmissions of cells of the PLMN.

FIG. 9 illustrates an example method 900 for providing an eDRS configuration and/or transmitting eDRSs based on the configuration. Method 900 of FIG. 9 will now be discussed in conjunction with the example architecture and components of eNB 704 (and, similarly, eNB 706) and UE 702 of the example system 700 of FIG. 7. Method 900 includes, at Block 902, generating a configuration related to measuring eDRS to determine a PLMN associated with the eDRS. In an aspect, eDRS configuration providing component 722, e.g., in conjunction with one or more processors 753 and memory 755, can generate the configuration related to measuring eDRS to determine the PLMN associated with the eDRS. For example, as described, eDRS configuration providing component 722 generates the configuration to instruct the UE 702 regarding measuring and/or reporting eDRSs received from one or more cells. For example, the configuration can include periodicity information for one or more synchronization or reference signals (e.g., PSS, SSS, CRS, etc.), such as cycle and/or offset parameters, parameters related to transmission of CSI-RS such as subframe offset (e.g., from the PSS), CSI-RS resource index or indices, scrambling identifier, etc., one or more thresholds related to reporting CSI-RS and CRS measurements (e.g., a threshold for reporting the measurements to the eNB 704, a threshold difference between the CSI-RS and CRS measurement below which the measurements are to be reported), and/or the like. In an example, eDRS configuration providing component 722 can generate the configuration based on a configuration received from one or more core network components (e.g., when registering with the network), based on a configuration stored in a memory of the eNB 704, etc. related to the PLMN of the eNB 704.

Method 900 can also include, at Block 904, providing the configuration to a served UE. In an aspect, eDRS configuration providing component 722, e.g., in conjunction with one or more processors 753 and memory 755, can provide via transceiver 751 the configuration to a served UE, such as UE 702. As described, UE 702 may operate eDRS configuration receiving component 716 to receive the configuration for utilizing in measuring and reporting eDRSs from one or more cells. For example, UE 702 may operate eDRS measuring component 710 to measure CSI-RSs and CRSs, and operate eDRS reporting component 712 to report the measurements based on the configuration, and/or to report certain measurements that are within a threshold difference based on the configuration. In another example, as described above, eDRS measuring component 710 of UE 702 can measure CSI-RSs that correspond to parameters in the configuration (e.g., subframe offset, resource indices, scrambling identifier, etc.), can measure PSS/SSS/CRS that correspond to parameters in the configuration (e.g., periodicity parameters), and/or the like, which can ensure the eNB 704 receives measurements from eNBs in the same PLMN.

Method 900 also includes, at Block 906, transmitting one or more eDRSs based at least in part on the configuration. In an aspect, communicating component 602, e.g., in conjunction with one or more processors 753 and memory 755, can transmit via transceiver 751 the one or more eDRSs based at least in part on the configuration. As described, this can include transmitting the one or more eDRSs as synchronization signals or reference signals according to the configuration generated by eDRS configuration providing component 722, which can be common among eNBs in the same PLMN, such to allow UEs receiving the eDRSs to identify and report the eDRSs to serving cells of the UE.

Method 900 can optionally include, at Block 908, receiving one or more CRS measurements and one or more CSI-RS measurements from a served UE. Communicating component 602, e.g., in conjunction with one or more processors 753 and memory 755, can receive via transceiver 751 the one or more CRS measurements and the one or more CSI-RS measurements from the UE 702. As described, the UE 702 can measure and report CSI-RS measurements and CRS measurements for various PCIs, which may be based on the configuration provided to the UE 702 by the eDRS configuration providing component 722.

Method 900 can also optionally include, at Block 910, determining a PLMN related to one or more cells that correspond to the one or more CRS measurements and the one or more CSI-RS measurements. In an aspect, PLMN determining component 724, e.g., in conjunction with one or more processors 753 and memory 755, can determine the PLMN related to the one or more cells that correspond to the one or more CRS measurements and the one or more CSI-RS measurements. For example, PLMN determining component 724 can determine the CRSs that correspond to the CSI-RSs measured for the PLMN based on determining CRSs and CSI-RSs having the same PCI, and that have measurement values within a threshold difference (such that it is likely the CRS and CSI-RS were transmitted from the same eNB).

Method 900 may also optionally include, at Block 912, determining whether to handover the UE to one or more cells or add a carrier for the UE with the one or more cells based at least in part on the PLMN and the measurements. In an aspect, communicating component 602, e.g., in conjunction with one or more processors 753 and memory 755, may include a determination component having determination logic that can determine whether to handover the UE (e.g., UE 702) to one or more cells or add a carrier for the UE (e.g., UE 702) with the one or more cells based at least in part on the PLMN and the measurements. Thus, for example, communicating component 602 can consider cells determined to be in the same PLMN as eNB 704 for handover and/or carrier addition in carrier aggregation, and can determine whether to handover the UE and/or add a carrier for the UE where the corresponding reported CSI-RS and/or CRS measurements achieve a threshold, achieve a threshold difference from measurements of eNB 704, achieve the threshold where measurements of eNB 704 are below a threshold, etc., as described.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for measuring cells in a public land mobile network (PLMN), comprising:
    receiving, via a wireless communication on an unlicensed carrier frequency, an enhanced discovery reference signal (eDRS) transmitted by a cell on the unlicensed carrier frequency, wherein the eDRS comprises at least a reference signal transmission or a synchronization signal transmission, and wherein the eDRS is subject to listen-before-talk (LBT);
    performing measurements of the eDRS for the cell based at least in part on a configuration associated with a serving cell; and
    reporting, via another wireless communication to the serving cell, the measurements of the eDRS.

2. The method of claim 1, wherein the reference signal transmission includes a common reference signal (CRS) and a channel state information reference signal (CSI-RS), and wherein reporting the measurements of the eDRS comprises reporting a CRS measurement and a CSI-RS measurement to the serving cell.

3. The method of claim 2, further comprising comparing the CRS measurement with the CSI-RS measurement to determine whether a difference between the CRS measurement and the CSI-RS measurement are within a threshold difference, wherein reporting the CRS measurement and the CSI-RS measurement is based at least in part on determining that the difference is within the threshold difference.

4. The method of claim 1, further comprising receiving the configuration, wherein the configuration relates to eDRS transmissions of a serving PLMN from the serving cell, and wherein performing measurements of the eDRS is based at least in part on one or more parameters of the configuration.

5. The method of claim 4, wherein the one or more parameters correspond to one or more of a subframe offset, a resource index, or a scrambling identifier identified for the eDRS transmissions transmitted as CSI-RSs.

6. The method of claim 1, further comprising:
    receiving a PLMN ID of a serving PLMN from the serving cell; and
    determining the configuration based at least in part on the PLMN ID, wherein the configuration relates to eDRSs transmitted as CSI-RSs of the serving PLMN,
    wherein performing measurements of the eDRS is based at least in part on one or more parameters of the configuration.

7. The method of claim 6, wherein the one or more parameters correspond to one or more of a subframe offset, a resource index, or a scrambling identifier identified for the CSI-RSs.

8. The method of claim 1, further comprising:
receiving a PLMN ID of a serving PLMN from the serving cell; and
determining the configuration based at least in part on the PLMN ID, wherein the configuration relates to primary synchronization signal, secondary synchronization signal, or common reference signal transmissions of the serving PLMN,
wherein performing measurements of the eDRS is based at least in part on one or more parameters of the configuration.

9. The method of claim 1, further comprising receiving the configuration, wherein the configuration relates to primary synchronization signal, secondary synchronization signal, or common reference signal transmissions of a serving PLMN from the serving cell, and wherein performing measurements of the eDRS is based at least in part on one or more parameters of the configuration.

10. A user equipment for measuring cells in a public land mobile network (PLMN), comprising:
a transceiver;
at least one processor communicatively coupled with the transceiver via a bus for communicating signals in a wireless network; and
a memory communicatively coupled with the at least one processor and/or the transceiver via the bus;
wherein the at least one processor and the memory are operable to:
receive, via the transceiver receiving a wireless communication on an unlicensed carrier frequency, an enhanced discovery reference signal (eDRS) transmitted by a cell on the unlicensed carrier frequency, wherein the eDRS comprises at least a reference signal transmission or a synchronization signal transmission, and wherein the eDRS is subject to listen-before-talk (LBT);
perform measurements of the eDRS for the cell based at least in part on a configuration associated with a serving cell; and
report, via the transceiver transmitting another wireless communication to the serving cell, the measurements of the eDRS.

11. The user equipment of claim 10, wherein the reference signal transmission includes a common reference signal (CRS) and a channel state information reference signal (CSI-RS), and wherein the at least one processor and the memory are operable to report the measurements of the eDRS at least in part by reporting a CRS measurement and a CSI-RS measurement to the serving cell.

12. The user equipment of claim 11, wherein the at least one processor and the memory are further operable to compare the CRS measurement with the CSI-RS measurement to determine whether a difference between the CRS measurement and the CSI-RS measurement are within a threshold difference, and wherein the at least one processor and the memory are operable to report the CRS measurement and the CSI-RS measurement based at least in part on determining that the difference is within the threshold difference.

13. The user equipment of claim 10, wherein the at least one processor and the memory are further operable to receive the configuration, wherein the configuration relates to eDRS transmissions of a serving PLMN from the serving cell, and wherein the at least one processor and the memory are operable to perform measurements of the eDRS based at least in part on one or more parameters of the configuration.

14. The user equipment of claim 13, wherein the one or more parameters correspond to one or more of a subframe offset, a resource index, or a scrambling identifier identified for the eDRS transmissions transmitted as CSI-RSs.

15. The user equipment of claim 10, wherein the at least one processor and the memory are further operable to:
receive a PLMN ID of a serving PLMN from the serving cell; and
determine the configuration based at least in part on the PLMN ID, wherein the configuration relates to eDRSs transmitted as CSI-RSs of the serving PLMN,
wherein the at least one processor and the memory are operable to perform measurements of the eDRS based at least in part on one or more parameters of the configuration.

16. The user equipment of claim 15, wherein the one or more parameters correspond to one or more of a subframe offset, a resource index, or a scrambling identifier identified for the CSI-RSs.

17. The user equipment of claim 10, wherein the at least one processor and the memory are further operable to:
receive a PLMN ID of a serving PLMN from the serving cell; and
determine the configuration based at least in part on the PLMN ID, wherein the configuration relates to primary synchronization signal, secondary synchronization signal, or common reference signal transmissions of the serving PLMN,
wherein the at least one processor and the memory are operable to perform measurements of the eDRS based at least in part on one or more parameters of the configuration.

18. The user equipment of claim 10, wherein the at least one processor and the memory are further operable to receive the configuration, wherein the configuration relates to primary synchronization signal, secondary synchronization signal, or common reference signal transmissions of a serving PLMN from the serving cell, and wherein the at least one processor and the memory are operable to perform measurements of the eDRS based at least in part on one or more parameters of the configuration.

19. A user equipment for measuring cells in a public land mobile network (PLMN), comprising:
means for receiving, via a wireless communication on an unlicensed carrier frequency, an enhanced discovery reference signal (eDRS) transmitted by a cell on the unlicensed carrier frequency, wherein the eDRS comprises at least a reference signal transmission or a synchronization signal transmission, and wherein the eDRS is subject to listen-before-talk (LBT);
means for performing measurements of the eDRS for the cell based at least in part on a configuration associated with a serving cell; and
means for reporting, via another wireless communication to the serving cell, the measurements of the eDRS.

20. The user equipment of claim 19, wherein the reference signal transmission includes a common reference signal (CRS) and a channel state information reference signal (CSI-RS), and wherein the means for reporting reports a CRS measurement and a CSI-RS measurement to the serving cell.

21. The user equipment of claim 19, further comprising means for receiving the configuration, wherein the configuration relates to eDRS transmissions of a serving PLMN from the serving cell, and wherein the means for performing performs measurements of the eDRS based at least in part on one or more parameters of the configuration.

22. The user equipment of claim 19, further comprising:
means for receiving a PLMN ID of a serving PLMN from the serving cell; and
means for determining the configuration based at least in part on the PLMN ID, wherein the configuration relates to eDRSs transmitted as CSI-RSs of the serving PLMN,
wherein the means for performing performs measurements of the eDRS based at least in part on one or more parameters of the configuration.

23. The user equipment of claim 19, further comprising:
means for receiving a PLMN ID of a serving PLMN from the serving cell; and
means for determining the configuration based at least in part on the PLMN ID, wherein the configuration relates to primary synchronization signal, secondary synchronization signal, or common reference signal transmissions of the serving PLMN,
wherein the means for performing performs measurements of the eDRS based at least in part on one or more parameters of the configuration.

24. The user equipment of claim 19, further comprising means for receiving the configuration, wherein the configuration relates to primary synchronization signal, secondary synchronization signal, or common reference signal transmissions of a serving PLMN from the serving cell, and wherein the means for performing performs measurements of the eDRS based at least in part on one or more parameters of the configuration.

25. A non-transitory computer-readable storage medium comprising computer-executable code for measuring cells in a public land mobile network (PLMN), the code comprising:
code for receiving, via a wireless communication on an unlicensed carrier frequency, an enhanced discovery reference signal (eDRS) transmitted by a cell on the unlicensed carrier frequency, wherein the eDRS comprises at least a reference signal transmission or a synchronization signal transmission, and wherein the eDRS is subject to listen-before-talk (LBT);
code for performing measurements of the eDRS for the cell based at least in part on a configuration associated with a serving cell; and
code for reporting, via another wireless communication to the serving cell, the measurements of the eDRS.

26. The non-transitory computer-readable storage medium of claim 25, wherein the reference signal transmission includes a common reference signal (CRS) and a channel state information reference signal (CSI-RS), and wherein the code for reporting reports a CRS measurement and a CSI-RS measurement to the serving cell.

27. The non-transitory computer-readable storage medium of claim 25, further comprising code for receiving the configuration, wherein the configuration relates to eDRS transmissions of a serving PLMN from the serving cell, and wherein the code for performing performs measurements of the eDRS based at least in part on one or more parameters of the configuration.

28. The non-transitory computer-readable storage medium of claim 25, further comprising:
code for receiving a PLMN ID of a serving PLMN from the serving cell; and
code for determining the configuration based at least in part on the PLMN ID, wherein the configuration relates to eDRSs transmitted as CSI-RSs of the serving PLMN,
wherein the code for performing performs measurements of the eDRS based at least in part on one or more parameters of the configuration.

29. The non-transitory computer-readable storage medium of claim 25, further comprising:
code for receiving a PLMN ID of a serving PLMN from the serving cell; and
code for determining the configuration based at least in part on the PLMN ID, wherein the configuration relates to primary synchronization signal, secondary synchronization signal, or common reference signal transmissions of the serving PLMN,
wherein the code for performing performs measurements of the eDRS based at least in part on one or more parameters of the configuration.

30. The computer-readable storage medium of claim 25, further comprising code for receiving the configuration, wherein the configuration relates to primary synchronization signal, secondary synchronization signal, or common reference signal transmissions of a serving PLMN from the serving cell, and wherein the code for performing performs measurements of the eDRS based at least in part on one or more parameters of the configuration.

* * * * *